United States Patent
Kucera et al.

(10) Patent No.: US 11,310,853 B2
(45) Date of Patent: Apr. 19, 2022

(54) MULTI-PATH DATA COMMUNICATIONS

(71) Applicant: Nokia Technologies Oy, Espoo (FI)

(72) Inventors: Stepan Kucera, Dublin (IE); Milind Buddhikot, Bridgewater, NJ (US); Kariem Fahmi, Dublin (IE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/651,053

(22) PCT Filed: Sep. 29, 2017

(86) PCT No.: PCT/FI2017/050687
§ 371 (c)(1),
(2) Date: Mar. 26, 2020

(87) PCT Pub. No.: WO2019/063868
PCT Pub. Date: Apr. 4, 2019

(65) Prior Publication Data
US 2020/0229253 A1 Jul. 16, 2020

(51) Int. Cl.
*H04W 76/15* (2018.01)
*G06F 9/54* (2006.01)
*H04L 45/24* (2022.01)
*H04W 28/20* (2009.01)
*H04W 28/24* (2009.01)
*H04W 88/02* (2009.01)

(52) U.S. Cl.
CPC ............ *H04W 76/15* (2018.02); *G06F 9/547* (2013.01); *H04L 45/24* (2013.01); *H04W 28/20* (2013.01); *H04W 28/24* (2013.01); *H04W 88/02* (2013.01)

(58) Field of Classification Search
CPC ...... H04L 45/24; H04W 76/15; H04W 28/24; H04W 28/20; G06F 9/547
See application file for complete search history.

(56) References Cited

U.S. PATENT DOCUMENTS

| | | | | |
|---|---|---|---|---|
| 10,127,091 | B1 * | 11/2018 | MacNeil | G06F 9/545 |
| 10,212,089 | B1 * | 2/2019 | Narayanan | H04L 47/125 |
| 10,331,471 | B1 * | 6/2019 | Viktorov | G06F 9/44526 |

(Continued)

OTHER PUBLICATIONS

"Technology Vision 2020: Networks that deliver Gigabytes per user per day profitably and securely", Nokia Networks white paper, Feb. 2015, pp. 1-24.

(Continued)

*Primary Examiner* — Syed Ali
(74) *Attorney, Agent, or Firm* — Squire Patton Boggs (US) LLP (57) ABSTRACT

A method and system is described in which a client device comprises a memory arranged as a user space and a kernel space. One operation comprises providing in the user space a user space control module for receiving one or more application calls destined for the kernel space. Another operation comprises receiving by the user space control module an application call for requesting data transmission using one or more kernel space network services. Another operation comprises implementing the requested data transmission over multiple paths from the client device under the control of the user space control module.

16 Claims, 11 Drawing Sheets

(56) References Cited

U.S. PATENT DOCUMENTS

| | | | | |
|---|---|---|---|---|
| 2005/0185621 | A1* | 8/2005 | Sivakumar | H04L 1/1887 |
| | | | | 370/335 |
| 2005/0195660 | A1* | 9/2005 | Kavuri | G06F 3/0607 |
| | | | | 365/189.05 |
| 2008/0047023 | A1* | 2/2008 | Lam | G06F 21/74 |
| | | | | 726/30 |
| 2014/0122727 | A1* | 5/2014 | Miner | H04L 45/56 |
| | | | | 709/227 |
| 2016/0330075 | A1* | 11/2016 | Tiwari | H04L 29/08072 |
| 2016/0357702 | A1* | 12/2016 | Shamis | H04L 67/40 |
| 2017/0366445 | A1* | 12/2017 | Nemirovsky | H04L 45/24 |
| 2019/0138324 | A1* | 5/2019 | Hu | G06F 9/45558 |

OTHER PUBLICATIONS

International Search Report and Written Opinion received for corresponding Patent Cooperation Treaty Application No. PCT/FI2017/050687, dated Jun. 12, 2018, 11 pages.
Shibuya et al., "Efficient Performance Diagnosis in OpenFlow Networks Based on Active Measurements", The Thirteenth International Conference on Networks, Feb. 24, 2014, pp. 268-273.

* cited by examiner

MULTI-PATH DATA COMMUNICATIONS

RELATED APPLICATION

This application claims priority to PCT Application No. PCT/FI2017/050687, filed on Sep. 29, 2017, which is incorporated herein by reference in its entirety.

FIELD

This disclosure relates to multi-path data communications, and particularly to the deployment and/or control of multi-path communications in communications devices.

BACKGROUND

To meet capacity versus cost requirements of wireless networks, for example next-generation wireless networks, standardization bodies such as 3GPP, IEEE and IETF have been focussing on technologies for multiple-path (multi-path) wireless communications.

Multi-path wireless communications refers to using multiple radio access technologies (RATs) for simultaneously delivering a single data flow over multiple wireless links, or paths, in parallel.

Multi-path wireless communications is attractive for a number of reasons.

For example, the aggregation of multiple independent data delivery paths into one logical connection increases overall throughput, as well as reducing latency. Resource pooling and multiplexing may be employed for this purpose. Inter-RAT bandwidth aggregation is not limited by per-RAT spectrum availability.

Multi-path wireless communications enable control of a wireless quality of service (QoS); temporary bandwidth outages may for example be masked out by using adaptive link multiplexing. End-to-end latency may be controlled using redundancy encoding in the form of packet-level forward error correction (FEC.)

Multi-path wireless communications allow operators to efficiently re-use existing multi-band, multi-technology infrastructure and offer high-speed connections without incurring significant costs associated with the roll-out of new, high-performance networks.

The installation and control of multi-path wireless communications functionality in communications devices, particularly (but not exclusively) legacy devices such as mobile telephones, smartphones and tablet computers is complex and potentially expensive.

SUMMARY

A first aspect provides a method comprising: in a client device comprising a memory arranged as a user space and a kernel space: providing in the user space a user space control module for receiving one or more application calls destined for the kernel space; receiving by the user space control module an application call for requesting data transmission using one or more kernel space network services; and implementing the requested data transmission over multiple paths from the client device under the control of the user space control module.

The user space control module may implement the requested data transmission in accordance with network usage rules.

The network usage rules may define a bandwidth management policy for each of the multiple paths.

The network usage rules may define a quality of service (Qos) policy for each of the multiple paths and/or multi-path connections.

The network usage rules may determine which network services to use for data transmission of the multiple paths based on the type of application making the application call.

The network usage rules may determine which network services to use for data transmission of the multiple paths based on the application service requirements and/or quality of service requirements.

The network usage rules may be dynamically updated in response to feedback data indicative of a measured bandwidth and/or quality of service performance.

The method may further comprise receiving the network usage rules from an external network management entity.

The user space control module may receive one or more application calls destined for the kernel space by means of modifying the associated application, when invoked, to point to a library associated with the user space control module for implementing multiple path control.

Modifying the associated application may comprise modifying its native call library to point to the multiple path control library.

The multiple path control library may generate, in place of an application call for a standard socket, a call for a multiple path method that opens multiple parallel sockets and a multiple path scheduler.

The user space control module may receive one or more application calls destined for the kernel space by means of modifying an application execution environment in the user space.

Modifying the application execution environment may comprise injecting system call hooks to a virtual machine, the system call hooks being for executing modified functions for implementing multiple path control.

Implementing the requested data transmission over multiple paths from the client device may comprise configuring one or more existing kernel protocols in the kernel space.

One or more existing kernel protocols may be configured to select radio interfaces for transmitting the data using multiple paths.

Implementing the requested data transmission over multiple paths from the client device may comprise modifying one or more existing kernel protocols in the kernel space.

The one or more existing kernel protocols may be modified by uploading a tailored congestion control module.

The tailored congestion control module may be uploaded from a memory module, e.g. a SIM card.

The tailored congestion control module may be uploaded from a remote server.

Implementing the requested data transmission over multiple paths from the client device may comprise implementing one or more new networking protocol stacks in the user space.

The implemented networking protocol stacks in the user space may comprise one or more of MPUDP, TCP over MPUDP, FEC-aware MPUDP, and a RAW socket-based protocol stack.

The method of any preceding definition may be performed without modification of kernel space functions.

The method of any preceding definition may be performed at one of a smartphone or a tablet computer.

A second aspect provides a computer program comprising instructions that when executed by a computer program control it to perform the method of any preceding definition.

A third aspect provides a non-transitory computer-readable storage medium having stored thereon computer-readable code, which, when executed by at least one processor, causes the at least one processor to perform a method, comprising: in a client device comprising a memory arranged as a user space and a kernel space: providing in the user space a user space control module for receiving one or more application calls destined for the kernel space; receiving by the user space control module an application call for requesting data transmission using one or more kernel space network services; and implementing the requested data transmission over multiple paths from the client device under the control of the user space control module.

A fourth aspect provides an apparatus, the apparatus having at least one processor and at least one memory having computer-readable code stored thereon which when executed controls the at least one processor: in a client device comprising a memory arranged as a user space and a kernel space: to provide in the user space a user space control module for receiving one or more application calls destined for the kernel space; to receive by the user space control module an application call for requesting data transmission using one or more kernel space network services; and to implement the requested data transmission over multiple paths from the client device under the control of the user space control module.

A fifth aspect provides an apparatus configured to perform the method of any preceding method definition.

BRIEF DESCRIPTION OF THE DRAWINGS

Example embodiments will now be described by way of non-limiting example with reference to the accompanying drawings, in which.

DETAILED DESCRIPTION OF PREFERRED EMBODIMENTS

Embodiments herein relate to multi-path networks, for example the deployment and control of data for transmission using multiple alternative paths through a network, or multiple networks. Embodiments particularly relate to data transmissions over wireless networks, for example next-generation wireless networks, although the disclosure is not limited to such.

As such the embodiments relate to methods and systems that may be performed at user equipment (UE) which may be one or more of a computer terminal, a mobile telephone, a smartphone, a laptop computer, a tablet computer and so on. The UEs may be legacy devices but embodiments may also be employed in future forms of UEs.

The use of multiple alternative paths, which may independent of one another, may yield a variety of benefits as stated above, including performance whereby aggregating different delivery paths into one logical connection increases overall throughput and may reduce latency. Further, QoS control may be controlled using multiple paths, for example by masking temporary bandwidth outages and FEC. Further, multi-path wireless communications allows operators to efficiently re-use existing spectral resources and infrastructure to offer high-speed connections without incurring significant costs.

The different alternative paths may use different communications technologies; for example a first path, or sub-flow of packets, may use a WiFi link and a second path, or sub-flow of packets may employ a third, fourth or fifth generation (3/4/5G) cellular network. Thus, different user equipment (UE) communications interfaces may be employed for the separate sub-flows.

Figure 1:
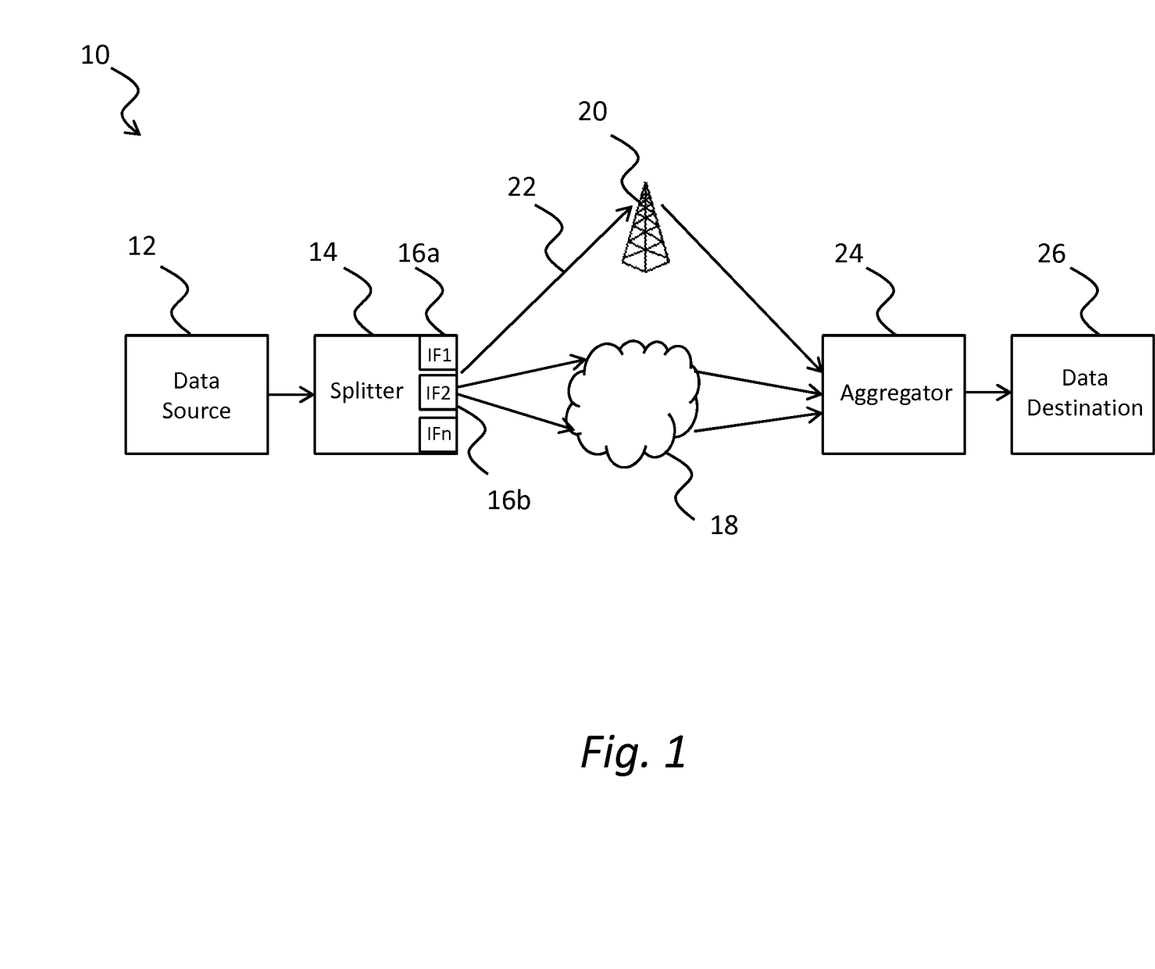
FIG. 1 is a block diagram of a multi-path network architecture according to an example embodiment.

FIG. 1 shows an example network architecture 10 according to a first embodiment. The architecture 10 comprises a data source 12, a splitter 14 having a plurality of communications interfaces 16a, 16b, a first IP network 18, a second IP network 20, a destination aggregator 24, and a data destination 26.

The data source 12 and data destination 26 may comprise any form of communications terminal for transmitting and/or receiving data packets. For example, the data source 12 and data destination 26 may each be one of a computer terminal, a mobile telephone, a smartphone, a laptop, a tablet computer or indeed any form of terminal with wireless data communications capability.

The splitter 14 may be any form of processing module associated with the data source 12; the splitter may form a part of the data source. The splitter 14 may for example be a hardware, software and/or firmware module within the data source 12. The hardware, software and/or firmware of the splitter 14 may be configured to perform the operations to be described below, for example by means of a processor, controller, plural processors or controllers, in association with RAM, one or more software applications stored on memory (e.g. a hard disk drive or removable memory module). In some cases, the one or more software applications may be cloud-based applications stored on a remote memory device and accessed by the splitter 14. In embodiments herein, the splitter 14 operates at the network level 3. The splitter 14 may be a virtual splitter or a physical splitter.

Within the splitter 14 may be a first communications interface (IF1) 16a which may be associated with over-the-air cellular communications. For example, the first communications interface 16a may comprise a 3/4/5G communications interface for data communications via one or more eNB base stations 20 associated with a cellular network. A second communications interface (IF2) 16b may be associated with internet communications via a fixed-line telephone network 18. Further communications interfaces (IFn) may also be provided.

The aggregator 24 may be any form of processing module associated with the data destination 26; the aggregator may form part of the data destination. The aggregator 24 may for example be a hardware, software and/or firmware module within the data destination 26. The hardware, software and/or firmware of the aggregator 24 may be configured to perform the operations of aggregating or combining the different sub-flows over respective links. The aggregator 24 may comprise a processor, controller, plural processors or controllers, in association with RAM, one or more software applications stored on memory (e.g. a hard disk drive or removable memory module). In some cases, the one or more software applications may be cloud-based applications stored on a remote memory device and accessed by the aggregator 24. In embodiments herein, the aggregator 24 operates at the network layer 3 (L3). The aggregator 24 may be a virtual aggregator or a physical aggregator.

Figure 2:
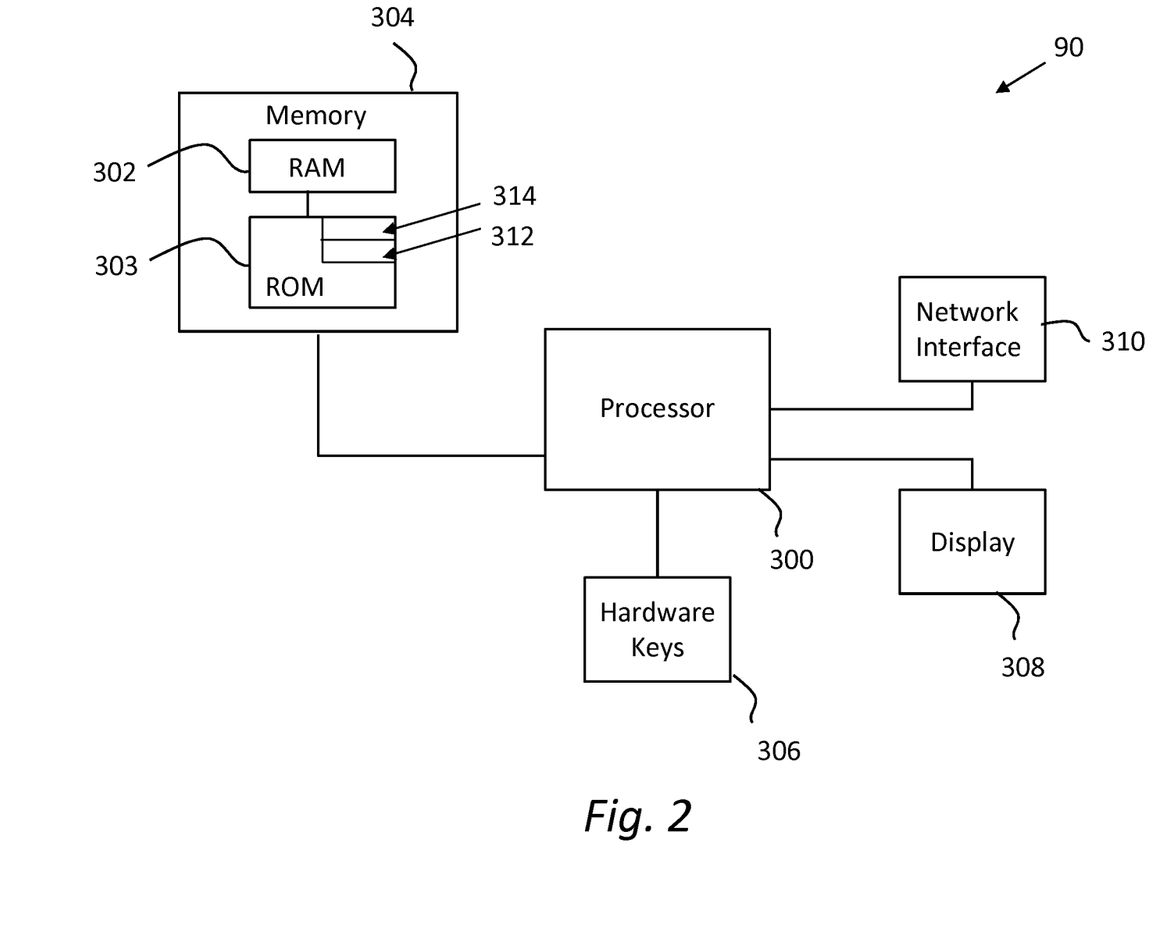
FIG. 2 is a schematic diagram of components of a processing module according to an example embodiment.

FIG. 2 is a schematic diagram of components of a mobile terminal 90, e.g. a smartphone. The mobile terminal 90 may have a processor 300, 302, a memory 304 closely coupled to the processor and comprised of a RAM 102 and ROM 103, hardware keys 306 and a display 308. The mobile terminal 90 may comprise one or more network interfaces 310 for connection to a network, e.g. a modem which may be wired or wireless.

The processor 300 is connected to each of the other components in order to control operation thereof.

The memory 304 may comprise a non-volatile memory such as read only memory, a hard disk drive (HDD) or a solid state drive (SSD). The ROM 303 stores, amongst other things, an operating system 312 and may store software applications 314. The RAM 302 is used by the controller 300 for the temporary storage of data. The operating system 112 may contain code which, when executed by the processor 300 in conjunction with the RAM 302, controls operation of each of the hardware components of the mobile terminal 90.

The processor 300 may take any suitable form. For instance, it may be a microcontroller, plural microcontrollers, a processor, or plural processors.

In some embodiments, the mobile terminal 90o may also be associated with external software applications. These may be applications stored on a remote server device and may run partly or exclusively on the remote server device. These applications may be termed cloud-hosted applications. The mobile terminal 90o may be in communication with the remote server device in order to utilize the software application stored there.

The operating system 312 may divide the memory 304 into kernel space, for managing operating system functions, and user space for managing application software. The kernel space is typically a protected area of the memory 304 preventing it from being overwritten by applications or other parts of the operating system 312. The kernel space includes a kernel program that conventionally connects application software in the user space to the hardware of the computer, e.g. the mobile terminal 90. The kernel program performs its tasks, such as running processes and handling interrupts, in kernel space. In contrast, anything user-related usually happens in user space.

Figure 3:
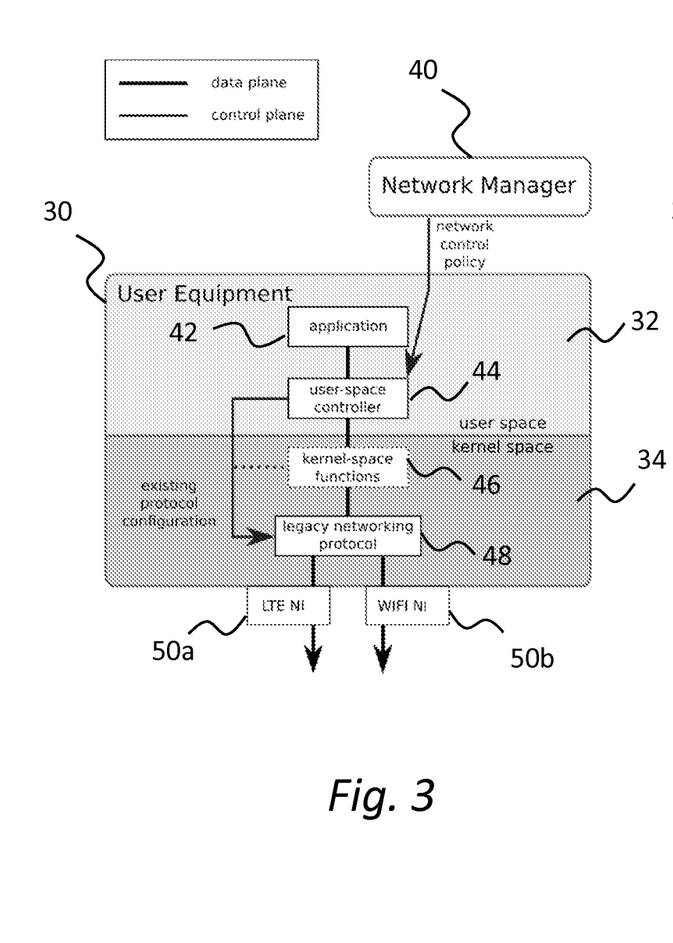
FIG. 3 is a schematic diagram of a user equipment (UE) memory space comprising a user space and a kernel space according to an example embodiment.

FIG. 3 is a schematic view of the memory space 30 of a UE, which for example may be the above-mentioned mobile terminal 90. The memory space 30 is arranged into a user space 32 and a kernel space 34, each having the roles and attributes mentioned above.

Within the user space 32 of the memory space 30 may reside at least one application program 42 and a user space controller 44. Within the kernel space 34 of the memory space 30 may reside a set of kernel-space functions 46 and a legacy networking protocol 48.

A plurality of network interfaces, which may be, but are not limited to, network interface cards (NICs) are also provided, for example a Long Term Evolution (LTE) interface 50a and a WiFi interface 50b. The network interfaces need not comprise cards, as in the case of a mobile telephone.

The application program 42 may be any form of application which makes system calls for kernel networking services, that is system calls to make data transfers by means of one or more of the LTE and WiFi NICs 50a, 50b. For example, the application program 42 may be for streaming video or audio media over an IP network. For example, the application program 42 may be related to a video streaming service.

The kernel space functions 46 represent functions necessary for applications 42 to communicate with the hardware, i.e. the NICs 50a, 50b. The kernel space functions 46 are generally in the form of a library that sits between the operating system and application programs.

The legacy networking protocol 48 defines the operating system signalling protocol for the kernel space functions 46 to communicate correctly with the hardware, e.g. the NICs 50a, 50b. This is usually done at the machine code level, and the networking protocol 48 is set by the operating system provider.

The user space controller 44 is a configured to receive system calls from the one or more application programs 42 destined for the kernel space functions 46. In other words, the user space controller 44 is configured to intercept the system calls from the application program 42 to access network services, such as requesting access to one or more of the NICs 50a, 50b for transmitting or receiving data over multiple respective sub-paths.

The user space controller 44 may be further configured, responsive to receiving an application call for a network service, to configure the existing, legacy kernel protocol 48 to perform the requested operations, for example for transmitting media using the LTE NIC 50a and/or WiFi NIC 50b. This interception by the user space controller 44 means that it can effectively replace or bypass, at least temporarily, the kernel space functions 48 which cannot, or should not, usually be modified.

Furthermore, because the user space controller 44 resides in the user space 32, it is appropriate for updates and reconfiguring on a regular basis.

Furthermore, the user space controller 44 may receive network control policy data from another entity shown in FIG. 3, which is a network manager 40.

The network manager 40 may be a remote device, for example associated with a wireless network, which determines one or more data represented policies relating to one or more networks. For example, the network manager 40 may implement traffic control policies based on various parameters, for example on a per-application basis, based on network conditions, and these policies may be updated and/or determined dynamically.

For example, if the network manager 40 provides a policy to the user-space controller 44 to send Voice over IP (VoIP) data over an LTE link whilst offloading non-critical photo uploads to best-effort random-access WiFi links, such a policy may be implemented by the user-space controller configuring the legacy networking protocol 48 to perform said policy. As the policy or policies change, so can the configuration of the legacy networking protocol 48 by means of the user-space controller 44.

Another example may the sending of a Youtube video over parallel LTE and WiFI links by means of the NICs 50*a*, 50*b*, if the policy so allows.

In this way, a non-invasive method using the user-space controller 44 provides multi-connectivity deployment in existing UEs as well as flexible traffic control on a per-application basis.

Figure 4:
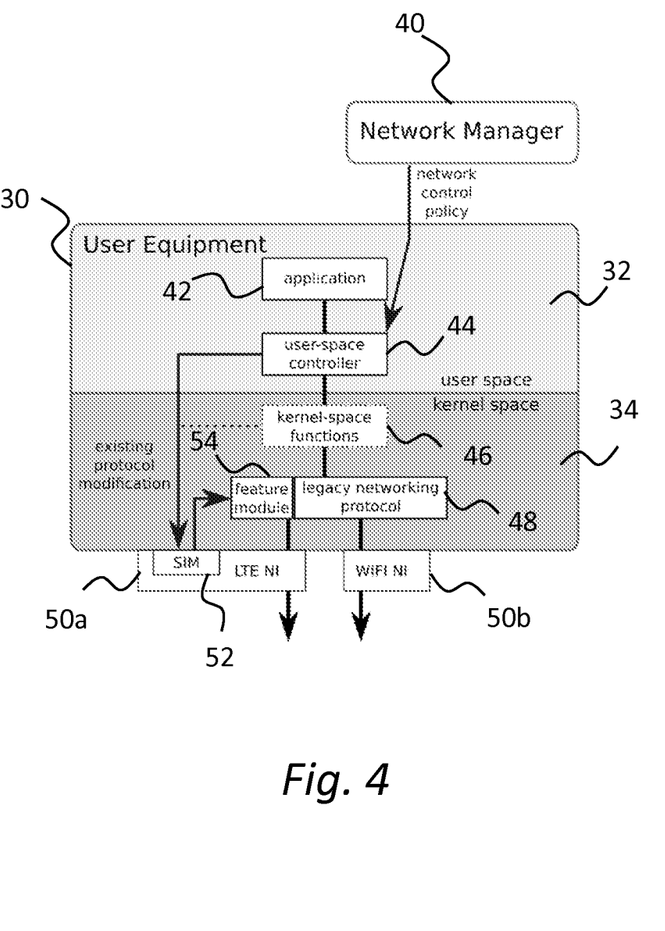
FIG. 4 is a schematic diagram of a UE memory space according to another example embodiment.

In relation to a further embodiment, FIG. 4 is a schematic view of the memory space 30 of the UE, which for example may be the same memory space shown in FIG. 3. The memory space 30 is likewise arranged into a user space 32 and a kernel space 34, each having the roles and attributes mentioned above.

As before, within the user space 32 may reside an application program 42 and a user space controller 44. Within the kernel space 34 of the memory space 30 may reside a set of kernel-space functions 46 and a legacy networking protocol 48. A plurality of network interface cards (NICs) may also be provided, namely a Long Term Evolution (LTE) NIC 50*a* and a WiFi NIC 50*b*.

In this embodiment, a feature module 54 may be loaded from a Subscriber Identity Module (SIM) 52 in the LTE NIC 50*a*. The SIM 52 can be a software SIM or a hardware SIM card. Other forms of memory module may also be used. The feature module 54 may comprise a tailored congestion control module particular to the LTE NIC 50*a*. It will be appreciated that other feature modules may be loaded from any other NIC having such a function.

In this embodiment, the legacy networking protocols 48 may be modified based on the feature module 54 for the specific feature module.

Figure 5:
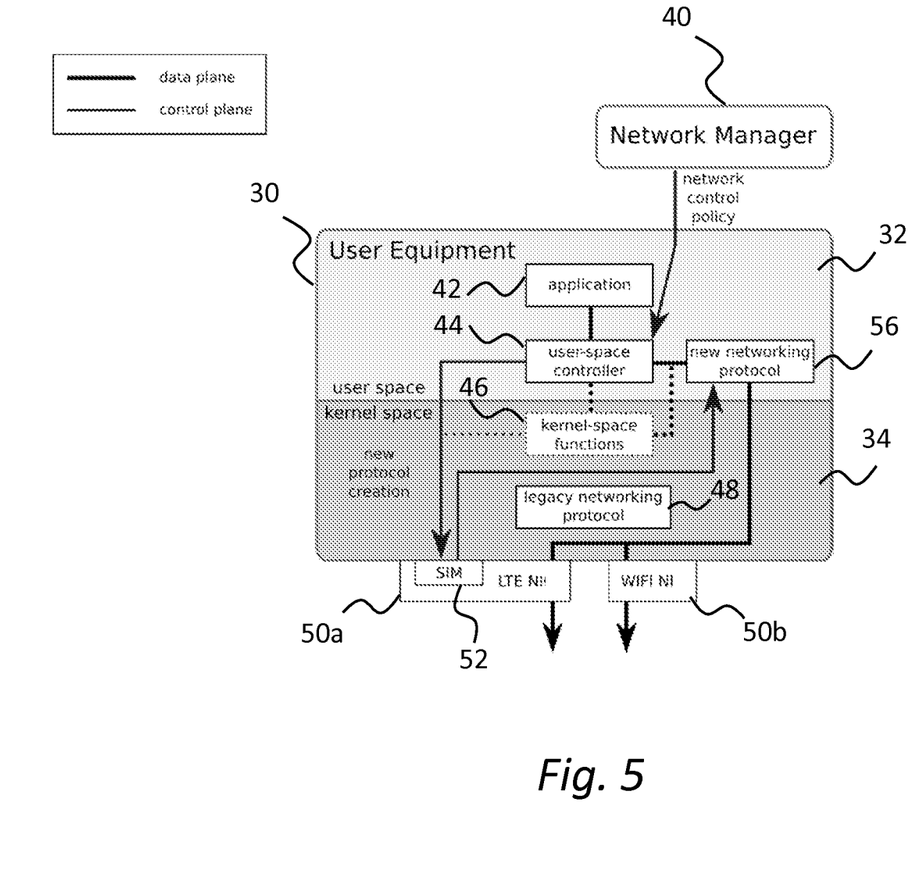
FIG. 5 is a schematic diagram of a UE memory space according to another example embodiment.

In relation to a further embodiment, FIG. 5 is a schematic view of the memory space 30 of the UE 30, which for example may be the same memory space shown in FIG. 3 and FIG. 4. The memory space 30 is likewise arranged into a user space 32 and a kernel space 34, each having the roles and attributes mentioned above.

As before, within the user space 32 may reside an application program 42 and a user space controller 44. Within the kernel space 34 of the memory space 30 may reside a set of kernel-space functions 46 and a legacy networking protocol 48. A plurality of network interface cards (NICs) may also be provided, namely a Long Term Evolution (LTE) NIC 50*a* and a WiFi NIC 50*b*.

In this embodiment, a new networking protocol 56 may also be provided in the use space 32. This effectively bypasses the legacy networking protocol 48. The new networking protocol 56 may be implemented in the injected code base, e.g. using one or more of MPUDP, TCP over MPUDP, FEC-aware MPUDP and a RAW socket-based protocol stack.

As mentioned, the user space controller 44 effectively intercepts application system calls from one or more applications 42 destined for the kernel space 34. This may be implemented in the user space 32 by one or more of:

modifying application code after activation of the application; applications may be loaded by a so-called LD_preload module that links to a modified C library for SOCKET calls;

or by modifying the application execution environment in the user space 32, such as by injecting system call hooks into an Android Dalvik/ART virtual machine using the so-called Xposed framework, or a similar JAVA method hooking mechanism. The virtual machine may be implemented in a sandbox that is reloaded with a new instance of the virtual machine each time. Alternatives to an Android Dalvik virtual machine are available, and this is given as one example. Certain operators can mandate different versions of JAVA, such as one that supports FeliCa, for example.

Once in control of data flows in this way, it will be appreciated that multi-connectivity and network control features may be implemented in the manner described with reference to FIGS. 3-5.

Figure 6:
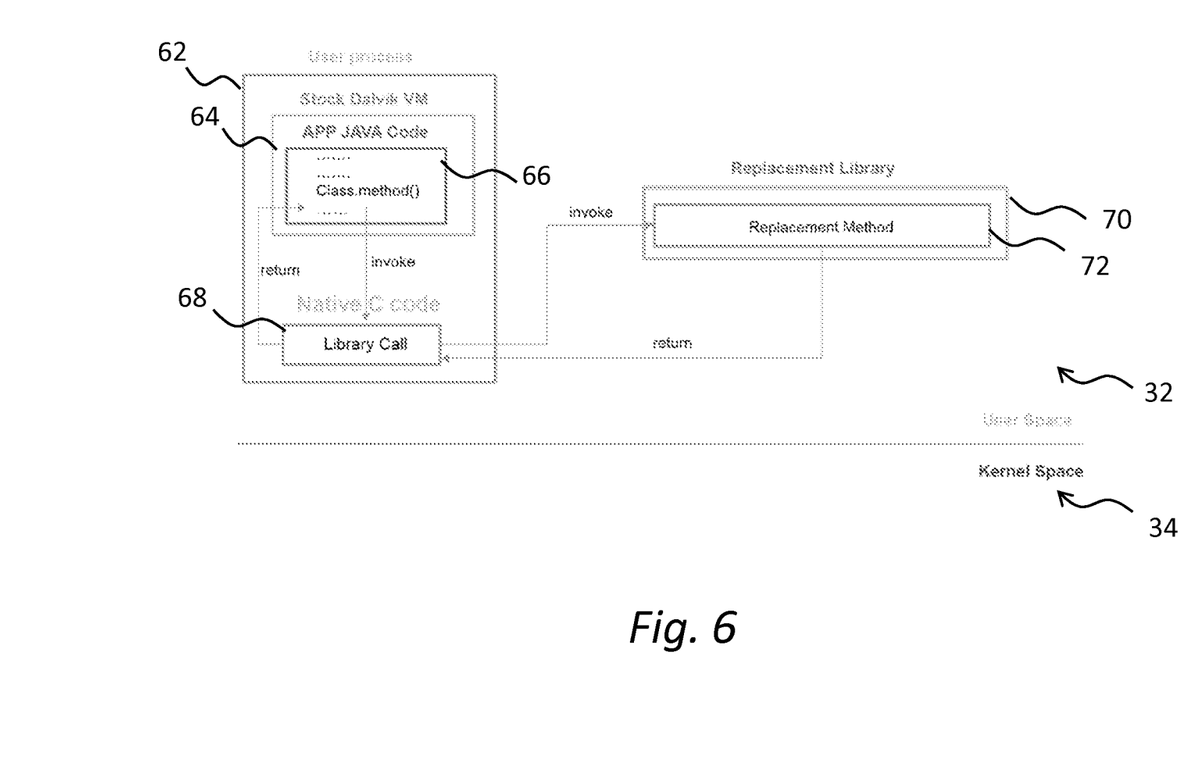
FIG. 6 is a schematic diagram of part of the FIG. 3-5 memory spaces for showing how application calls may be intercepted according to an example embodiment.

Referring to FIG. 6, a process for multi-connectivity deployment will now be described in accordance with an embodiment.

The process is based on modifying the module that loads libraries required for standard application operation. The process may involve dynamically replacing system call libraries during application activation with one or more modified libraries that implement multi-connectivity and the control of data flow. In Android operating systems, for example, the so-called LD_preload function may be used for linking replacement libraries.

In FIG. 6, a user process is represented by the element 62 and resides in the user space 32. The application, when invoked, generates the user process 62 which runs JAVA code 66 on a Stock Dalvik virtual machine 64, configured to invoke a library call 68 which links to a replacement library 70 which comprises the replacement method 72. The replacement method 72 is returned to the library call and then to the JAVA code 66 in the user space 32. All this is performed without interference with the kernel space 34.

In this example, a standard User Datagram Protocol (UDP) socket call can, for example, be replaced with a call for a multi-path UDP (MPUDP) method that causes multiple parallel UDP sockets to be opened and implements a multi-path scheduler.

Figure 7:
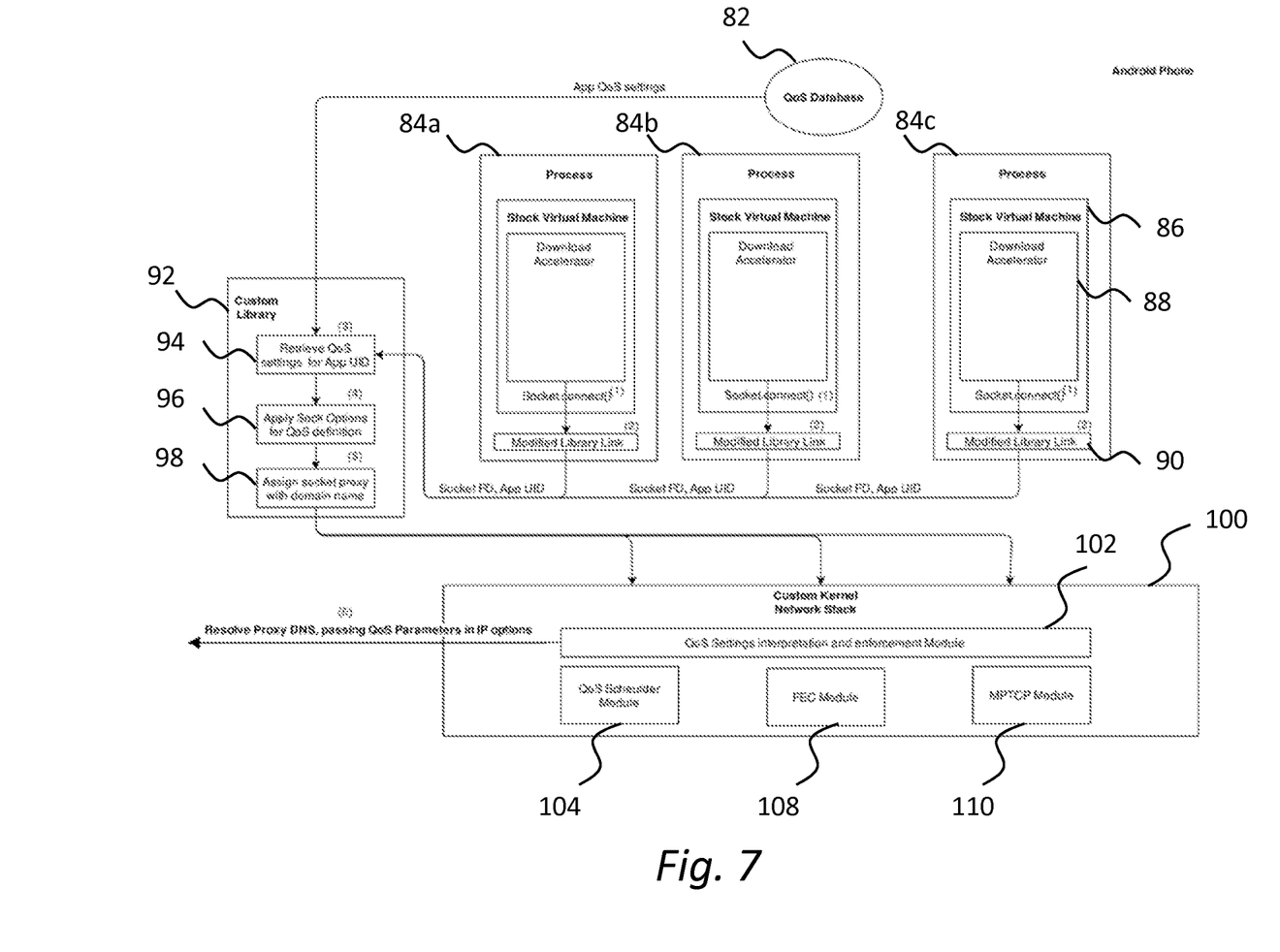
FIG. 7 is a schematic diagram of a Quality of Service (QoS) aware multi-path system according to an example embodiment.

With reference to FIG. 7, in another example, a QoS-aware multi-path TCP (MPTCP) connection utilizing FEC may be implemented in an analog manner using a QoS database storing information on application-specific QoS targets. In this example, a QoS database 82, which may be stored locally in the user space 32 upon receipt from the network manager 40, provides application QoS settings for use with a custom library 92 implemented in the same way as for the FIG. 6 example. In the shown example, a plurality of user processes 84*a*, 84*b*, 84*c* are invoked in the user space 32 and, via their modified library link, pass their respective Socket File Descriptor (FD) and application unique identifier (UID) to the custom library 92.

For example, the custom library 92 may be arranged, based on the received Socket FDs, application IDs and the QoS settings to:

(i) retrieve the QoS setting(s) for the application UID (94);

(ii) applying socket options for the QoS definition (96); and (iii) assign a socket proxy with a domain name (98).

The results for each process 84*a*, 84*b*, 84*c* may be transferred to a custom kernel network stack 100 which may resolve the proxy Domain Name Server (DNS), and passes the QoS parameters in IP options. The custom kernel network stack 100 may employ a QoS settings interpretation and enforcement module, a QoS scheduler module 104, a FEC module 108 and a MPTCP module 110.

Figure 8:
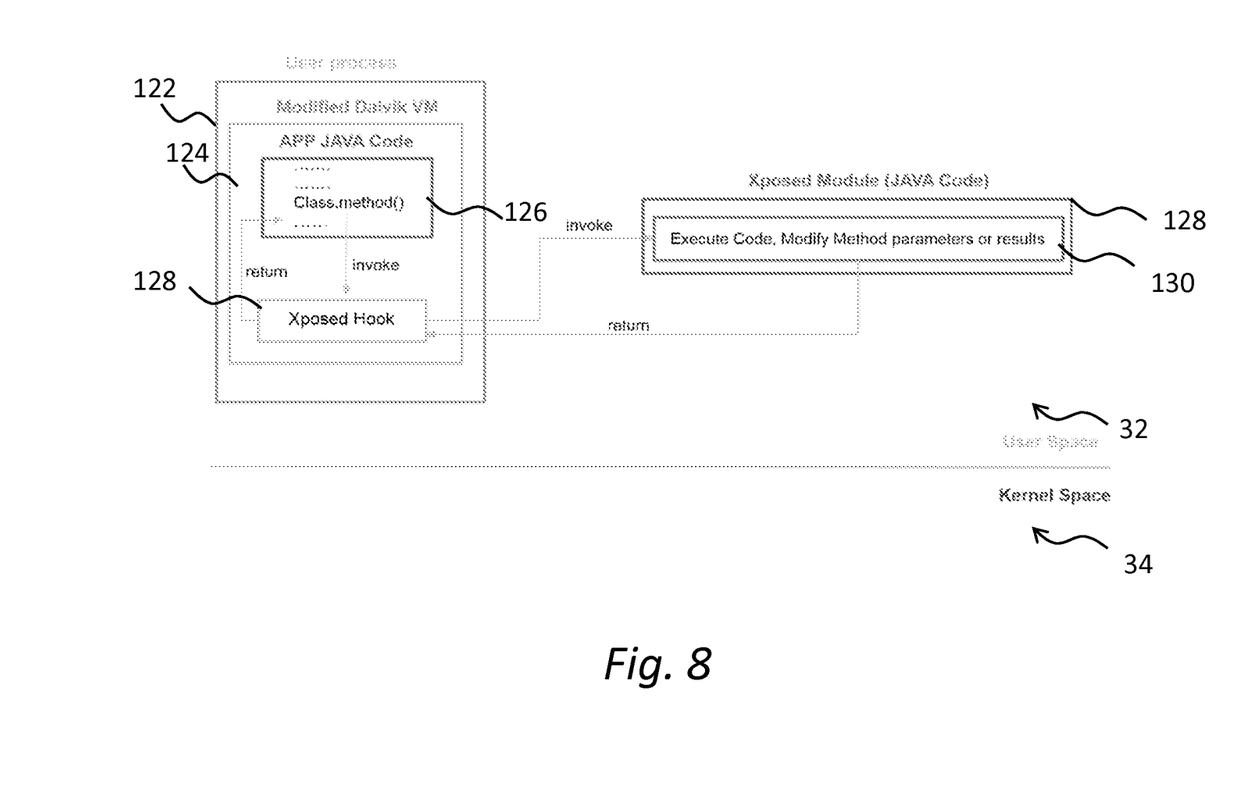
FIG. 8 is a schematic diagram of part of the FIG. 3-5 memory spaces for showing how application calls may be intercepted according to another example embodiment.

Another approach to system call interception and multi-connectivity implementation may comprise modifying the application execution environment in the user space 32. With reference to FIG. 8, which is similar to FIG. 6, a user process is represented by the element 122 and resides in the user space 32. The application, when invoked, generates the user process 122 which runs JAVA code 126 on a Stock Dalvik virtual machine 123, configured to invoke one or more injected system call hooks 128.

In this embodiment, the system call hook 128 is a so-called Xposed hook, based on the Android system, by means of using the so-called Xposed framework.

The one or more Xposed hooks 128 are configured to execute one or more modified functions implementing the required features. The one or more modified functions are implemented as a Xposed module (Java code) 128 and may comprise functions such as, but not limited to, executing code, modifying method parameters or results, to give some examples. The results are returned to the Xposed hook 128 and to the JAVA code 126.

Figure 9:
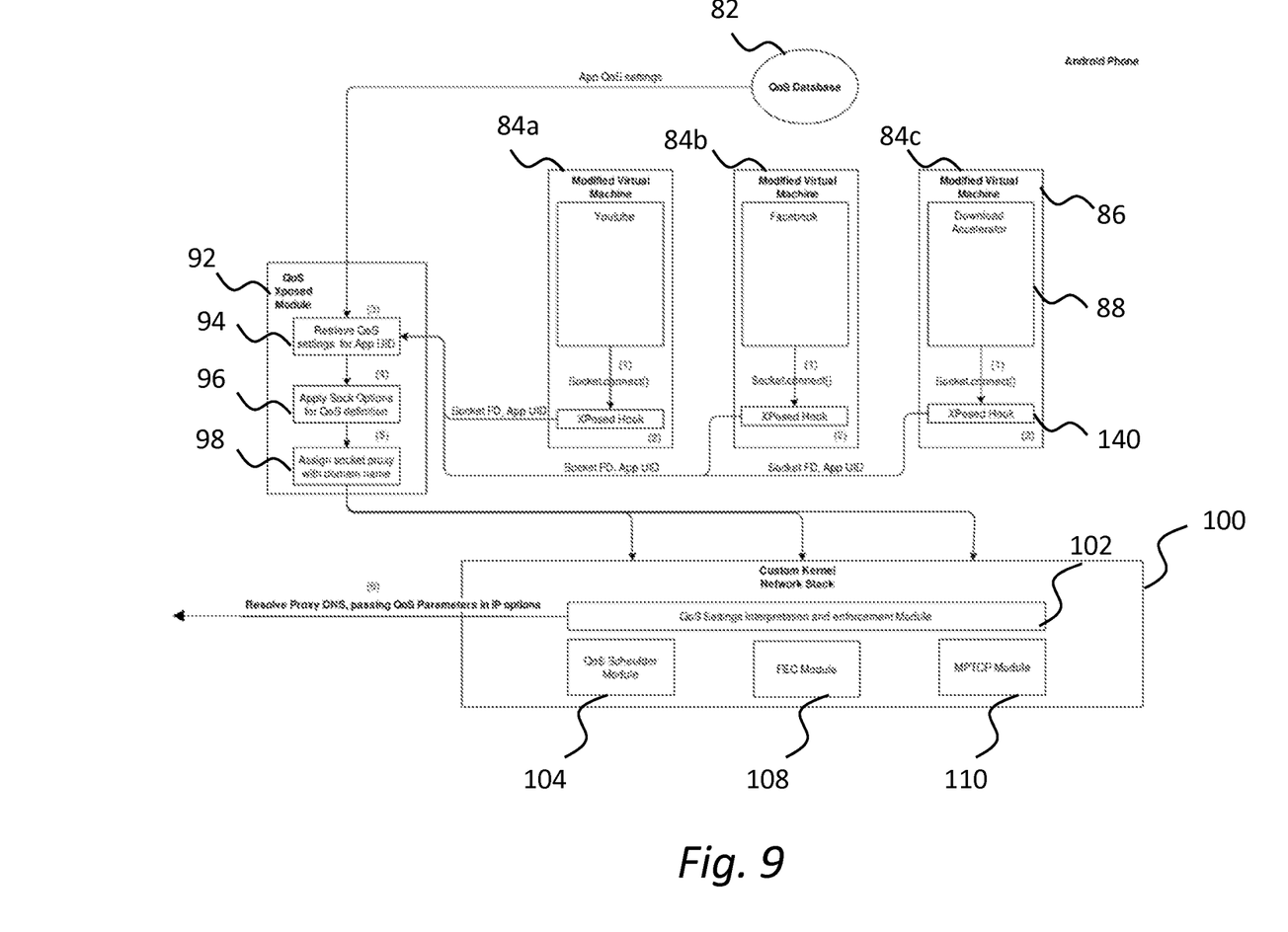
FIG. 9 is a schematic diagram of a QoS aware multi-path system according to another example embodiment.

FIG. 9 shows, to complement FIG. 7, how a QoS-aware MPTCP may be implemented using the FIG. 8 Xposed concept, or indeed any concept employing modification of the application execution environment in the user space 32. FIG. 9 is similar to FIG. 7, save for the modified library links 90 being replaced with hooks 140.

Policy-Driven Multi-Connectivity Control

Embodiments relating to how the network manager 40 may operate will now be described with reference to FIGS. 10 to 12.

Figure 10:
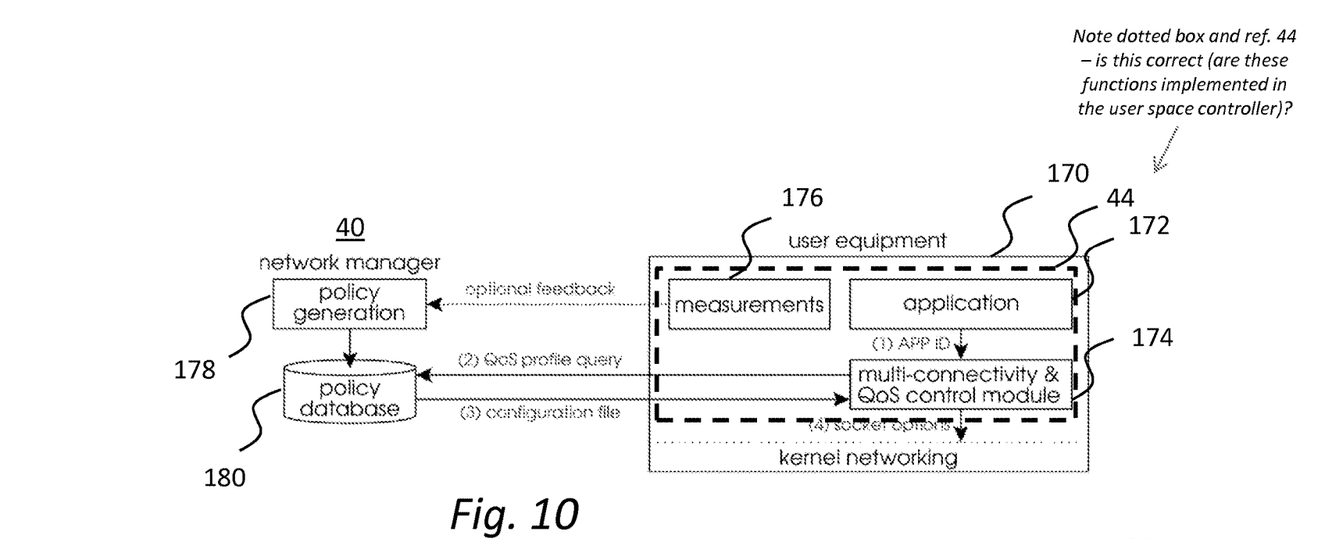
FIG. 10 is a schematic diagram showing interaction between a network manager and a UE for generating a centralised network control policy according to embodiments.

Referring to FIG. 10, in overview, a network policy comprises a set of data generated at the network manager 40. The network policy may be pro-actively generated at the network manager 40 in a step 178 and stored in a policy database 180. The policy database 180 may be stored or copied to a SIM card, e.g. the LTE SIM card 52. The SIM may alternatively be a software SIM. Other forms of memory module may be used. The network policy may alternatively be uploaded on-the-fly from a remote server. The network policy may define network usage rules, for example relation to quality of service (QoS) including application service requirements and/or quality of service requirements. The rules may relate to a common connection or different connections.

A UE 170 having an application 172 may provide its application UID to a multi-connectivity and QoS control module 174, which may form part of the user space controller 44, which then may query the policy database 18*o*, wherever it is located, with a QoS profile query. The policy database 18*o* may store application-specific network configurations, which is or are passed in the form of a configuration file back to the user space controller 44 in the form of socket options. This permits centralised network optimisation of socket parameters, such as rate caps or interface types.

In some embodiments, feedback may be received from a measurement module 176 in the user equipment.

Figure 11:
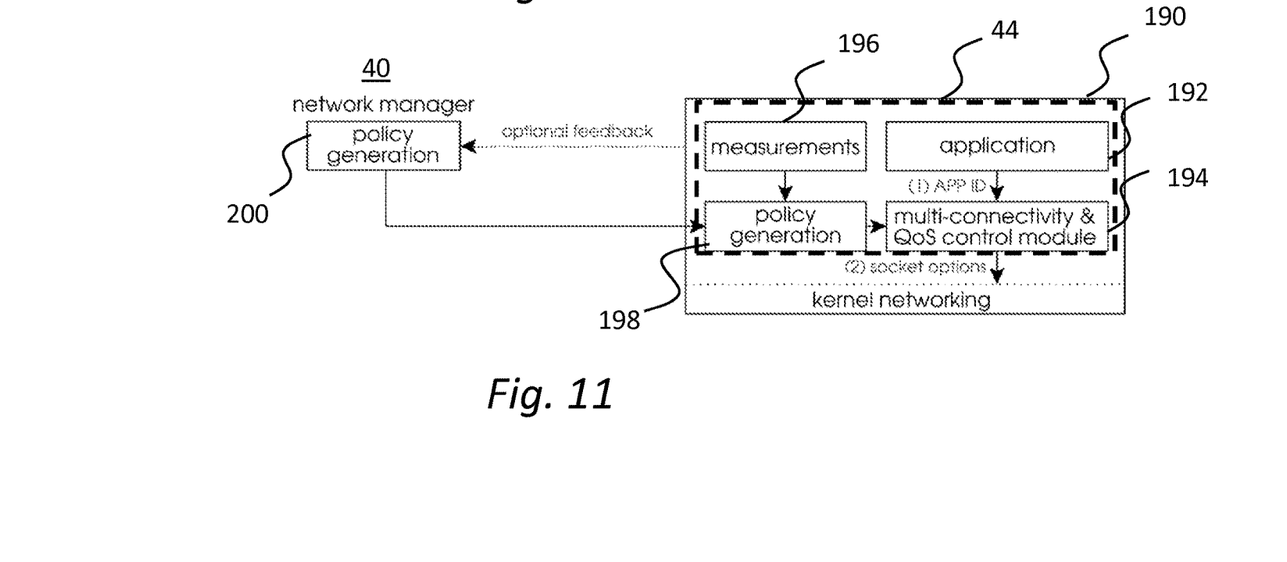
FIG. 11 is a schematic diagram showing interaction between a network manager and a UE for generating a distributed network control policy according to embodiments.

Referring to FIG. 11, an alternative method of implementing a network control policy may comprise generating the policy directly in a UE 190 based on measurements received from a local measurement module 196 and algorithmic guidelines received from the policy generation module 200 of the network manager 40. Again, feedback may be received at the policy generation module 200 from the measurement module 196 of the UE 190. This method may be more efficient in terms of data exchange overhead.

Otherwise, this alternative method operates in a corresponding way to the FIG. 10 example.

In general, the embodiments enable re-using kernel support of desired features. For example, support of MPTCP may be expected in future smartphones and other communications devices.

Figure 12:
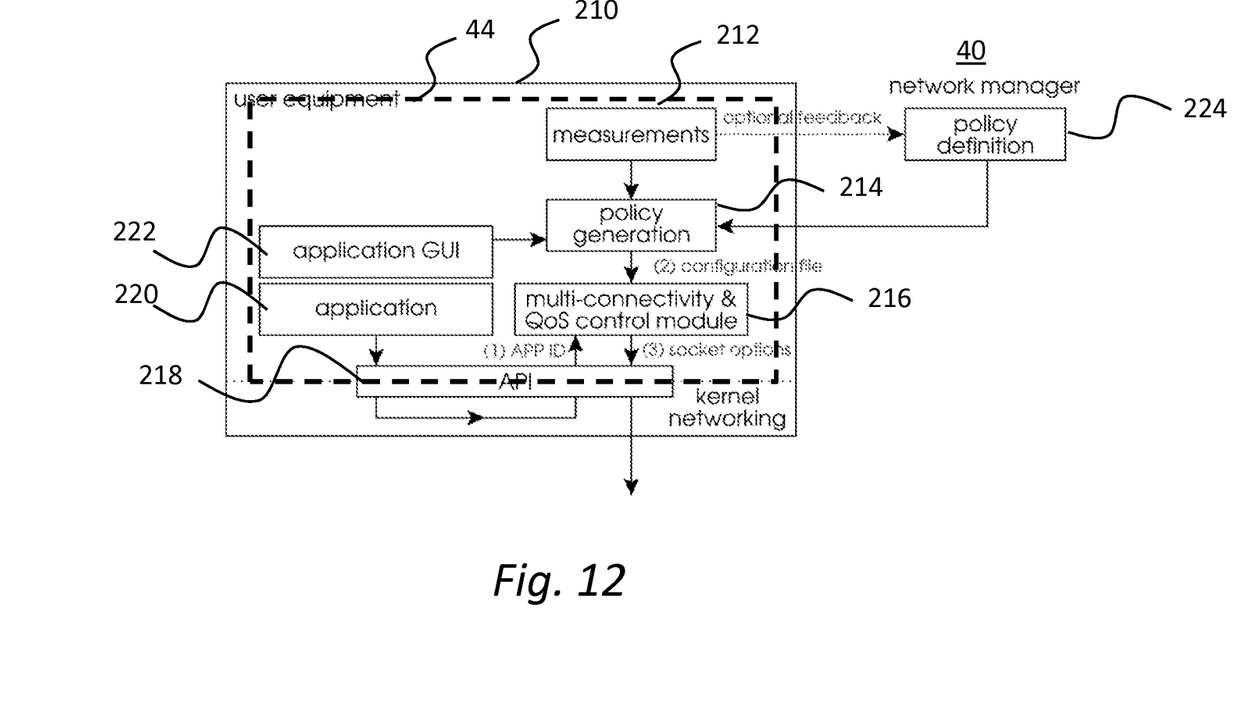
FIG. 12 is a schematic diagram showing a UE employing kernel support for multi-connectivity, according to embodiments.

Referring now to FIG. 12, the operating system of a UE 210 may support the methods and systems described above by forwarding application system calls to the user space controller 44, using a dedicated API 218. The execution on said user space controller 44 is advantageous in that it offers isolation from sensitive kernel operations as well as allowing use of known, well-established and supported programming approaches for its implementation.

The kernel space 34 may further support the operation of the method and systems described above by offering to various parameters of the network stack layers such as radio network signal strength (on the physical layer), handover times and contention measures (medium access layer), routing properties (network layer) and congestion control states (transport layer) as well as UE-related parameters such as battery life.

Figure 13:
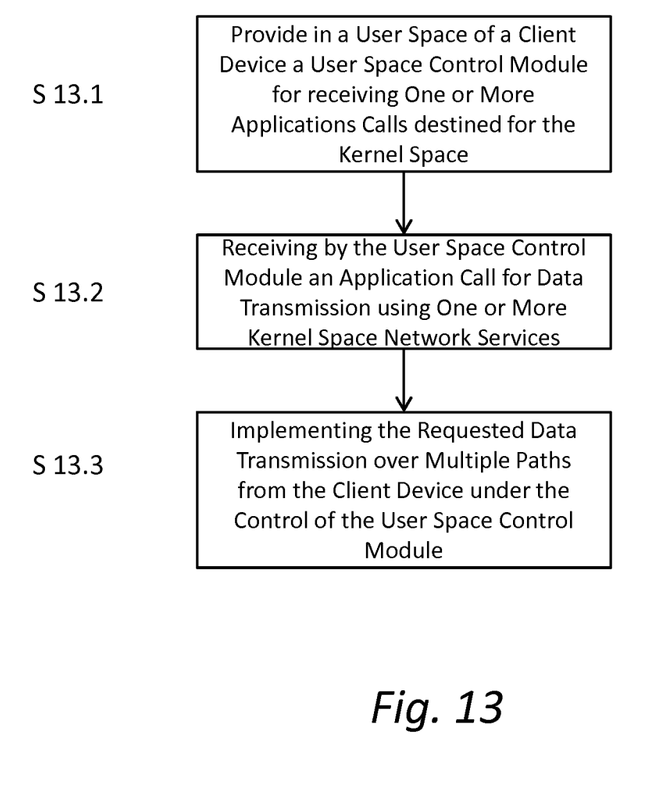
FIG. 13 is a flow diagram showing processing steps that may be performed by the UE in accordance with embodiments.

FIG. 13 is a flow diagram showing processing steps that may be performed by a UE in implementing the above methods and systems.

A first operation 13.1 comprises providing in a user space of a client device (or UE) a user space control module for receiving one or more application calls destined for the kernel space. Another operation 13.2 comprises receiving by the user space control module an application call for data transmission using one or more kernel space network services. Another operation 13.3 comprises implementing the requested data transmission over multiple paths from the client device under the control of the user space control module.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
in a client device comprising a memory arranged as a user space and a kernel space:
providing in the user space a user space control module for receiving one or more application calls destined for the kernel space;
receiving by the user space control module an application call for requesting data transmission using one or more kernel space network services; and
implementing the requested data transmission over multiple paths from the client device under the control of the user space control module, wherein implementing the requested data transmission over multiple paths from the client device comprises implementing one or more new networking protocol stacks in the user space, wherein the user space control module receives one or more application calls destined for the kernel space by means of modifying an application execution environment in the user space, wherein modifying the application execution environment comprises injecting system call hooks to a virtual machine, the system call hooks being for executing modified functions for implementing multiple path control, and wherein the implemented networking protocol stacks in the user space comprise one or more of MPUDP, TCP over MPUDP, FEC-aware MPUDP, and a RAW socket-based protocol stack.

2. The method of claim 1, wherein the user space control module implements the requested data transmission in accordance with network usage rules.

3. The method of claim 2, wherein the network usage rules define a bandwidth management policy for each of the multiple paths.

4. The method of claim 2, wherein the network usage rules define a quality of service (Qos) policy for each of the multiple paths and/or multi-path connections.

5. The method of claim 2, wherein the network usage rules determine which network services to use for data transmission of the multiple paths based on the type of application making the application call.

6. The method of claim 2, wherein the network usage rules determine which network services to use for data transmission of the multiple paths based on the application service requirements and/or quality of service requirements.

7. The method of claim 2, wherein the network usage rules are dynamically updated in response to feedback data indicative of a measured bandwidth and/or quality of service performance.

8. The method of claim 1, wherein the user space control module receives one or more application calls destined for the kernel space by means of modifying the associated application, when invoked, to point to a library associated with the user space control module for implementing multiple path control.

9. The method of claim 8, wherein modifying the associated application comprises modifying its native call library to point to the multiple path control library.

10. The method of claim 8, wherein the multiple path control library generates, in place of an application call for a standard socket, a call for a multiple path method that opens multiple parallel sockets and a multiple path scheduler.

11. The method of claim 1, wherein implementing the requested data transmission over multiple paths from the client device comprises configuring one or more existing kernel protocols in the kernel space.

12. The method of claim 11, wherein the one or more existing kernel protocols are configured to select radio interfaces for transmitting the data using multiple paths.

13. The method of claim 1, wherein implementing the requested data transmission over multiple paths from the client device comprises modifying one or more existing kernel protocols in the kernel space.

14. A non-transitory computer-readable storage medium having stored thereon computer-readable code, which, when executed by at least one processor, causes the at least one processor to perform a method, comprising:

in a client device comprising a memory arranged as a user space and a kernel space:

providing in the user space a user space control module for receiving one or more application calls destined for the kernel space;

receiving by the user space control module an application call for requesting data transmission using one or more kernel space network services; and implementing the requested data transmission over multiple paths from the client device under the control of the user space control module, wherein implementing the requested data transmission over multiple paths from the client device comprises implementing one or more new networking protocol stacks in the user space, wherein the user space control module receives one or more application calls destined for the kernel space by means of modifying an application execution environment in the user space, wherein modifying the application execution environment comprises injecting system call hooks to a virtual machine, the system call hooks being for executing modified functions for implementing multiple path control, and wherein the implemented networking protocol stacks in the user space comprise one or more of MPUDP, TCP over MPUDP, FEC-aware MPUDP, and a RAW socket-based protocol stack.

15. An apparatus, the apparatus having at least one processor and at least one memory having computer-readable code stored thereon which when executed controls the at least one processor:

in a client device comprising a memory arranged as a user space and a kernel space:

to provide in the user space a user space control module for receiving one or more application calls destined for the kernel space;

to receive by the user space control module an application call for requesting data transmission using one or more kernel space network services; and to implement the requested data transmission over multiple paths from the client device under the control of the user space control module, wherein implementing the requested data transmission over multiple paths from the client device comprises implementing one or more new networking protocol stacks in the user space, wherein the user space control module receives one or more application calls destined for the kernel space by means of modifying an application execution environment in the user space, wherein modifying the application execution environment comprises injecting system call hooks to a virtual machine, the system call hooks being for executing modified functions for implementing multiple path control, and wherein the implemented networking protocol stacks in the user space comprise one or more of MPUDP, TCP over MPUDP, FEC-aware MPUDP, and a RAW socket-based protocol stack.

16. The apparatus of claim 15, wherein the user space control module is configured to implement the requested data transmission in accordance with network usage rules.

* * * * *